United States Patent [19] [11] 4,278,347
Okamoto et al. [45] Jul. 14, 1981

[54] CATHODE-RAY TUBE IMAGE RECORDING DEVICE

[75] Inventors: Yoshihiko Okamoto; Tamotu Yoshizawa; Takahiro Ohta, all of Asaka; Koichi Murata, Tokyo, all of Japan

[73] Assignee: Fuji Photo Film Co., Ltd., Minami-ashigara, Japan

[21] Appl. No.: 119,594

[22] Filed: Feb. 7, 1980

[30] Foreign Application Priority Data

Mar. 13, 1979 [JP] Japan .................................. 54-28915

[51] Int. Cl.³ .............................................. G03B 27/72
[52] U.S. Cl. ...................................... 355/68; 358/130; 358/244; 358/129; 354/76; 346/151
[58] Field of Search ................. 355/20, 68, 69, 83, 355/9; 358/129–132, 244; 354/76–82; 346/110 R, 151, 161

[56] References Cited

U.S. PATENT DOCUMENTS 3,400,632  9/1968  Wahli ....................................... 355/20
3,938,164  2/1976  Ohnishi et al. .................... 358/130 X Primary Examiner—L. T. Hix
Assistant Examiner—W. J. Brady
Attorney, Agent, or Firm—Sughrue, Rothwell, Mion, Zinn and Macpeak

[57] ABSTRACT

A cathode-ray tube image recording device for recording images on a photosensitive thermal development recording medium which may have a reduced sensitivity due to time deterioration. An image of a density wedge is exposed and developed then sensed to determine the sensitivity of the recording medium. The sensing operation produces a density identification step number which is used to set one or both of the brightness and light emission time of the cathode-ray tube in accordance with a predetermined characteristic curve or function. A switchable resistor circuit or read-only memory may be used for applying the characteristic function.

7 Claims, 14 Drawing Figures

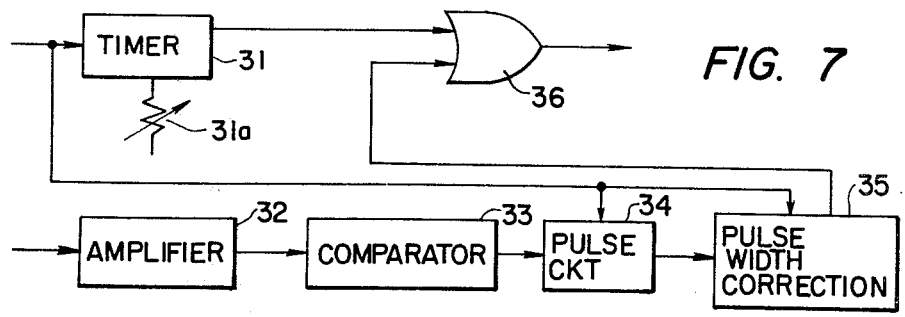
FIG. 7
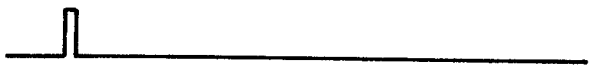
FIG. 8A
FIG. 8B
FIG. 8C
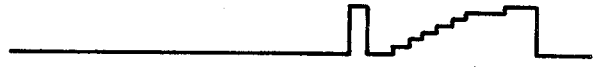
FIG. 8D
FIG. 8E
FIG. 8F
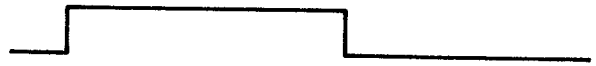
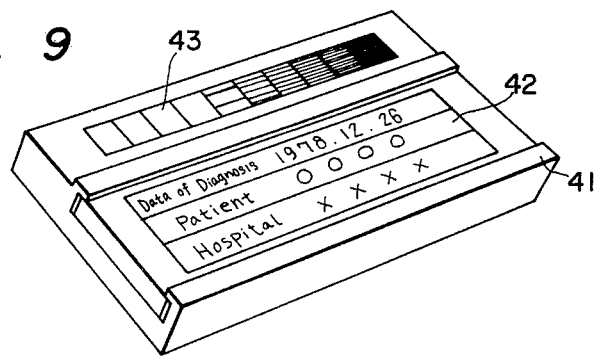
FIG. 9

CATHODE-RAY TUBE IMAGE RECORDING DEVICE

BACKGROUND OF THE INVENTION

The present invention relates to a device for recording an image on a cathode-ray tube on a photosensitive thermal development recording medium with suitable density maintained at all times.

A photosensitive thermal development recording medium is one which is, after being subjected to image exposure by light, developed by being heated, for instance, at 100° C. Such a recording medium is commercially available and sold under the trade name "DRY SILVER" made by Minesota Mining & Manufacturing Co. (3M Co.). In general, a photosensitive thermal development recording medium is suitable for producing a hard copy which can be readily and instantaneously developed. However, it suffers from drawbacks in that, before it is used, its stability over a period of time is low. That is, its sensitivity is considerably reduced if it is held at room temperature. For one particular photosensitive thermal development recording medium which has been tested, its sensitivity is reduced to about one-third if it is held at a temperature of 25° to 30° C. Therefore, the recording medium must be subjected to trial development several times in order to determine the exposure data to obtain the optimum density of an image.

In view of this, the invention relates to a device in which, in order to eliminate all of the above-described difficulties, an image of a density wedge used for determining the extent of sensitivity deterioration of a recording medium is optically projected onto the recording medium separately from the image on a cathode-ray tube. The identification step number, at which a density higher than the fog density is provided, of the density wedge developed is photo-electrically or visually determined whereby the exposure data of the image on the cathode-ray tube is corrected to perform recording with a suitable density. According to the invention, the recording can be achieved with a suitable density after carrying out the trial development only once.

BRIEF DESCRIPTION OF THE DRAWINGS

A preferred embodiment of the device according to the invention will be described with reference to the accompanying drawings.

FIG. 7 is a block diagram showing an exposure time correction circuit;

FIGS. 8A through 8F are waveform diagrams showing signals in various elements in the circuit shown in FIG. 7; and FIG. 9 is a perspective view showing an identification card holder.

DESCRIPTION OF THE PREFERRED EMBODIMENTS

Figure 1:
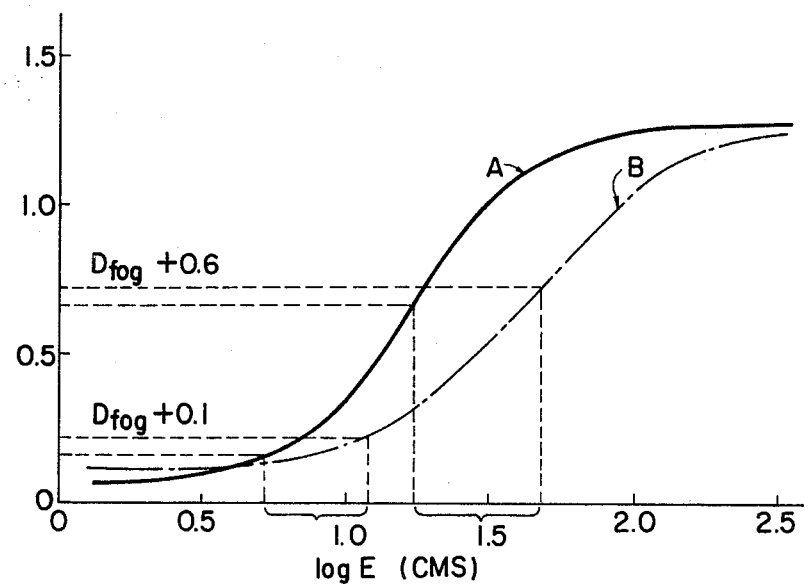
FIG. 1 is a graphical representation indicating the characteristic curves of photosensitive thermal development recording mediums.

FIG. 1 illustrates the deterioration with time of a photosensitive thermal development recording medium. In FIG. 1, the horizontal axis is a logarithmic axis representing exposure data while the vertical axis represents optical density. The curve A is a characteristic curve of a recording medium which has been stored at a temperature of 5° to 10° C. in a refrigerator. The curve B is a characteristic curve of a recording medium which has been held at a room temperature of 25° to 30° C. for one week. The recording mediums were subjected to thermal development at 125° C. for five seconds using a heated drum. If the two curves are compared with each other at the levels Dfog+0.6 where Dfog is the fog density value, then it is apparent that the sensitivity of the recording medium held at room temperature is reduced to 1/2.3 and 1/2.8 compared With that of the recording medium stored in a refrigerator. The graphical representation in FIG. 1 indicates that the density of an image part, which was originally 1.0, is reduced to 0.55 is one week. For such a sensitivity, the density of the image is insufficient as a whole and the image is not suitable for use as a hard copy.

In the case where a photosensitive sheet or a film roll which has been stored in a refrigerator is loaded into the recording device, it may take one day or at worst one or two weeks to use up the film roll. If the roll is taken out of the recording device and stored in a refrigerator after each day of operation of the recording device, then the sensitivity deterioration may be reduced. However, as during the operation of the recording device, the recording medium is held in the recording device, the sensitivity deterioration is advanced. In addition, it should be noted that the rate of sensitivity deterioration is increased as the temperature increases.

Figure 2:
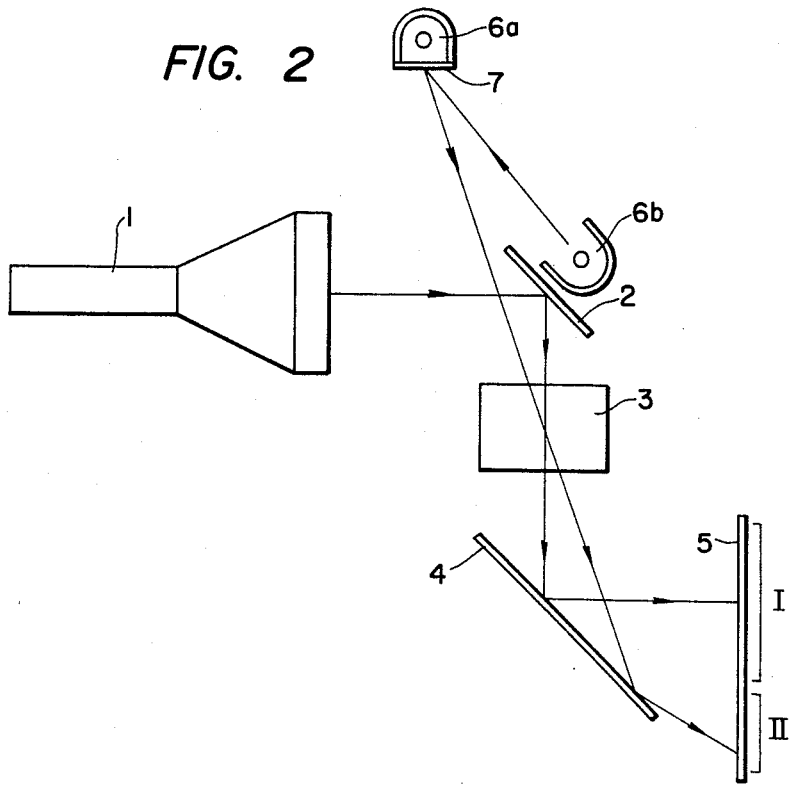
FIG. 2 is an explanatory diagram showing the arrangement of a recording optical system.

A method for determining the degree of sensitivity deterioration of photosensitive thermal development recording medium and for correcting the exposure data of an image on a cathode-ray tube will be described with reference to FIG. 2. FIG. 2 shows an optical system adapted for recording an image on a cathode-ray tube and a sensitivity deterioration determining density wedge image. The image on the cathode-ray tube is formed in the region I on a recording medium 5 by means of mirrors 2 and 4 and a lens 3. A deterioration determining density wedge 7 is irradiated by a light source 6a and 6b such as a xenon tube and the image of the density wedge 7 is formed in the region II on the recording medium 5 by means of the lens 3 and the mirror 4. The light source 6a is used when the determining density wedge 7 is of the transmitting type while the light source 6b is employed when the density wedge 7 is of the reflecting type. The density wedge 7 may be either of the continuous type or of the step type. However, the density wedge of the step type will be described by way of example.

A density wedge image was recorded on various photosensitive thermal development recording mediums having different sensitivity deteriorations and the exposure data necessary for recording the image on the cathode-ray tube with a suitable density were obtained through recording experiments in which the exposure time was varied. As a result, the relation between the density wedge identification step number and the exposure data coefficient necessary for recording the cathode-ray tube image is as indicated in FIG. 3.

The density wedge used was of a ten-step wedge having a density difference ΔD of approximately 0.1. Similar recording experiments were performed for other photosensitive thermal development recording mediums to provide the curves of FIG. 4. The thermal development was carried out using a hot plate at 110° C. for 40 seconds. The curve A is for the case where the identification step number was determined by placing a recording film over a fluorescent lamp. The curve B is for the case where the relation density was determined by placing a recording film on a white sheet under room light. The intensity of the density wedge irradiating light source was controlled so that the identification step number of a film stored in a refrigerator become "8" with the film placed over the fluorescent lamp. The curve A is shifted by one in identification step number from the curve B. However, this causes no problem if one of the curves A and B is utilized in the method of determination. Exposure data correcting experiments were conducted with two different kinds of photosensitive thermal development recording mediums with the results of these experiments shown in FIGS. 3 and 4. From the second experiment on, copies excellent in reproducibility and correct in density were obtained.

Figure 5:
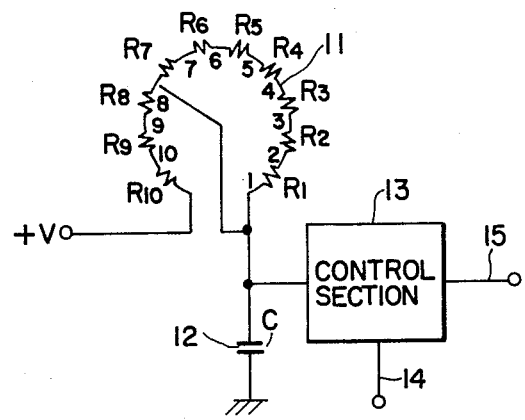
FIG. 5 is an explanatory diagram for a timer section.

In order to simplify the exposure data correction procedure, the arrangement utilized should be so designed that, as is apparent from the example shown in FIG. 5, the necessary exposure time can be set merely by setting an exposure dial to the identification step number. In FIG. 5, a timer section includes a group of resistors 11 for determining the exposure time of the cathode-ray tube image, a capacitor 12 and a control section 13. When a copy signal is applied to the terminal 14 of the control section 13, an exposure pulse having a time width determined by the resistor of resistors 11 and the capacitor is outputted from the terminal 15 of the control section 13 thereby controlling the light emission time. The light emission time may be controlled by using a mechanical shutter which is electronically controllable.

Figure 3:
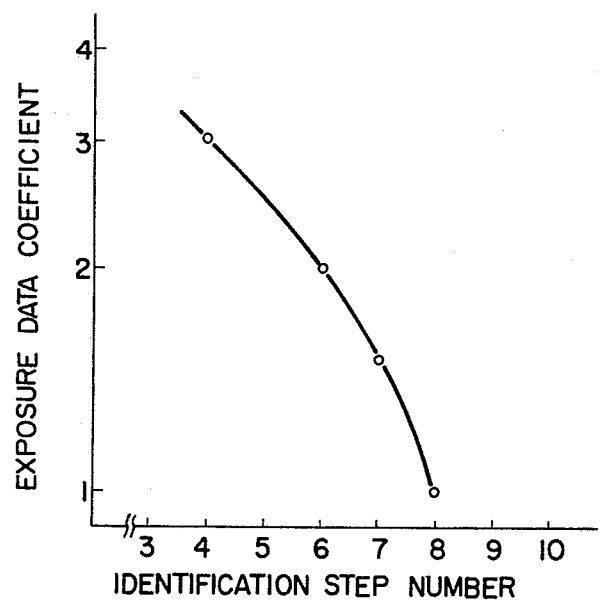
FIGS. 3 and 4 are graphical representations indicating the relations between an identification step number and necessary exposure data coefficients of two kinds of thermal phenomenon recording mediums.
Figure 4:
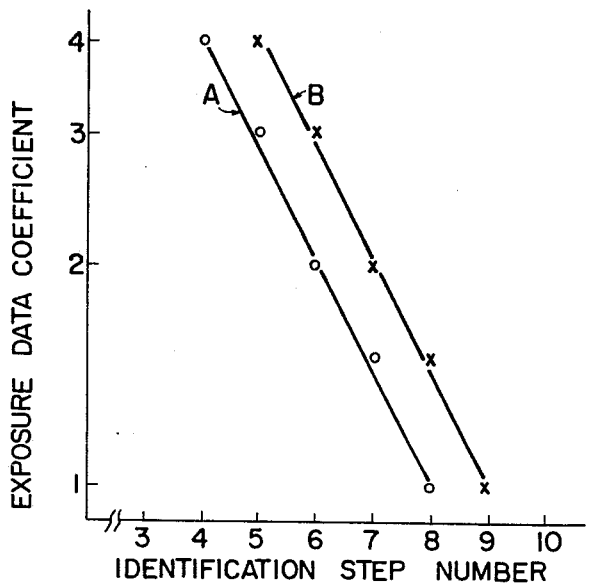

With reference to FIG. 3, a method for determining the values of the group of resistors 11 will be described. The identification step number of a photosensitive thermal development recording medium stored in a refrigerator is eight. Therefore, the values of the resistors $R_{10}$, $R_9$ and $R_8$ which are connected in the circuit when the exposure dial is set to eight, should be determined so that the cathode-ray tube image has a suitable density with respect to the time constant $(R_{10}+R_9+R_8) \times C$ which determines the exposure time. In the example, the value of the resistor $R_{10}$ only should be determined with $R_8=R_9=0$. In the case when the exposure dial is set to seven, the value of the resistor $R_7$ should be determined so that the value $(R_{10}+R_9+R_8+R_7) \times C$ is equal to the exposure data correction coefficient 1.5 which is obtained from FIG. 3. Similarly, the values of the resistors $R_6$, $R_5$, $R_4$, etc. can be determined with the exposure dial setting to six, five, four etc., respectively. Thus, recording can be effected with the correct exposure time merely setting the exposure dial to the identification step number. In the example given, the exposure time is varied to control the exposure data. The same factor can be utilized for setting the brightness dial of the cathode-ray tube.

Instead of visually reading the identification step number of a recorded density wedge, a technique may be employed in which the identification step number is photo-electrically read and displayed by means such as light emitting diodes and the exposure dial is set to the figure displayed thereby.

Figure 6:
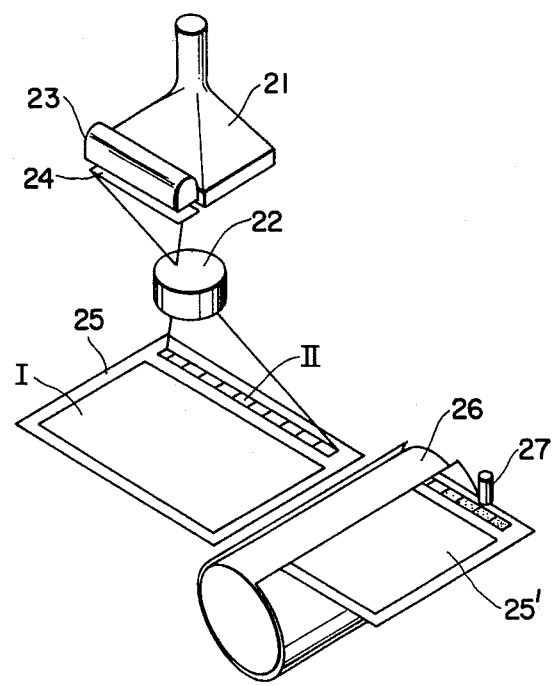
FIG. 6 is a perspective view showing the arrangement of a recording device.

A device for automatically correcting exposure data also will next be described with reference to an example. FIG. 6 shows the general arrangement of such a recording device. An image on a cathode-ray tube 21 is formed on the region I of a recording medium 25 by means of a lens 22. A density wedge is irradiated by a light source such as a xenon tube and its image is formed on the region II of the recording medium 25 by means of the lens 22. The recording medium 25 thus treated is heated at a temperature of higher than 100° C. at a thermal development section 26 as a result of which a visible image 25' is produced. The density of the density wedge image is measured with a light detecting unit 7 provided at the outlet of the thermal development section. The light detecting unit 7 includes a light emission section such as a light emitting diode and a light receiving section which may for example include a phototransistor.

FIG. 7 is a block diagram showing a circuit in which the identification step number of the density wedge is photoelectrically measured and the exposure time is automatically corrected from the results of the measurement. Upon application of a copy signal to a timer section 31, an exposure pulse, the width of which is determined by an exposure time adjusting variable resistor $31a'$ is produced. The variable resistor should be set in accordance with the determined exposure time. At the initial copying time, only the exposure pulse from the timer section 31 is applied to an OR circuit 36 and the exposure is effected for the period of time which is determined by the setting of the variable resistor $31a$. After being subjected to exposure, the recording medium is subjected to thermal development to provide a visible image. The density wedge recorded is photoelectrically sensed and a recorded signal representing the sensed density wedge is amplified by an amplifier 32 and is then applied to a comparator 33. The output of the comparator 33 is provided with a pulse width which is proportional to the identification step number in an identification step number proportion pulse width circuit 34. The pulse width is changed by a correction pulse width circuit 35 which includes a counter and a read-only memory (ROM) so that the correction condition follows the recorded result as specified in FIG. 3 or 4.

The correction value is stored in a memory such as a ROM. From the second copy on, an exposure pulse for time-corrected according to the sensitivity deterioration is outputted by the correction pulse width circuit 35 and is applied to an OR circuit 36. The OR circuit 36 outputs the time-corrected exposure pulse to control the light emission of the cathode-ray tube.

FIGS. 8A–8F show signal waveforms at various points in the circuit shown in FIG. 7. More specifically, FIG. 8A shows a copying start signal, FIG. 8B, the output signal of the timer 31 as set by the variable resistor $31a$, FIG. 8C, a photoelectric power signal applied to the amplifier 32, FIG. 8D, the output signal of the comparison circuit 33, FIG. 8E, the output signal of the identification step number proportion pulse width circuit 34, and FIG. 8F, the output signal of the correction pulse width circuit 35.

Recording an image of a cathode-ray tube is extensively employed in the field of medical treatment such as ultrasonic wave diagnosis or CT. In this case, in addition to a diagnosis image displayed on the cathode-ray tube, identification (ID) information such as the hospital name, the patient's name, and the date of diagnosis is often recorded as auxiliary information. Furthermore, often an identification card on which necessary information such as the patient's name is described is inserted into the recording device and is then recorded together with the image of the cathode-ray tube. For recording the above-described sensitivity determining density wedge, recording the density wedge as a part of the identification information is economical because the identification card irradiating light source can be used commonly. FIG. 9 shows an identification card holder with a density wedge. An identification card 42 can be freely inserted into the holder 41 on which the density wedge 43 is affixed.

According to the invention, even if the sensitivity of the recording medium has deteriorated, the deterioration can be compensated for from the second recording on so as to obtain a recorded image with correct density.

What is claimed is:

1. A device for recording an image on a cathode-ray tube on a photosensitive thermal development recording medium which comprises: means for exposing a recording medium sensitivity determining density wedge; means for sensing a developed sensitivity determining density wedge for producing a density identification step number; means for controlling at least one of the brightness and light emission time of said cathode-ray tube in response to said density identification step number.

2. The device as claimed in claim 1 further comprising means for exposing auxiliary information commonly with said sensitivity determining density wedge.

3. The device as claimed in claim 1 wherein said sensing means comprises photo-electric sensing means.

4. The device as claimed in claim 1 wherein said controlling means comprises means for setting said at least one of said brightness and light emission time in response to a predetermined characteristic function.

5. The device as claimed in claim 4 wherein said controlling means comprises means for providing a plurality of switchable resistance values, said resistance values being determined in accordance with said characteristic function.

6. The device as claimed in claim 4 wherein said controlling means comprises means for producing a pulse having a width in proportion to said at least one of said brightness and light emission time.

7. The device as claimed in claim 6 wherein said pulse producing means comprises a read-only memory for storing data corresponding to said characteristic function.

* * * * *